United States Patent [19]

Steinbrenner et al.

[11] Patent Number: 4,541,390

[45] Date of Patent: Sep. 17, 1985

[54] METHOD AND APPARATUS FOR DETERMINING AN INJECTION MOMENT DURING A START PROCESS IN AN INTERNAL COMBUSTION ENGINE

[75] Inventors: Ulrich Steinbrenner, Stuttgart; Dieter Günther, Murr, both of Fed. Rep. of Germany

[73] Assignee: Robert Bosch GmbH, Stuttgart, Fed. Rep. of Germany

[21] Appl. No.: 590,878

[22] Filed: Mar. 19, 1984

[30] Foreign Application Priority Data

Mar. 25, 1983 [DE] Fed. Rep. of Germany ....... 3310920

[51] Int. Cl.³ .............................................. F02M 51/00
[52] U.S. Cl. .................................. 123/491; 123/179 L; 123/478
[58] Field of Search .................. 123/179 L, 490, 491, 123/478

[56] References Cited

U.S. PATENT DOCUMENTS

| 3,646,915 | 3/1972 | Rachel | 123/491 |
| 3,763,833 | 10/1973 | Rachel | 123/490 |
| 3,923,031 | 12/1975 | Keranen | 123/179 L |
| 4,092,717 | 5/1978 | Di Nunzio | 123/490 X |
| 4,140,084 | 2/1979 | Di Nunzio | 123/490 |
| 4,180,020 | 12/1979 | Reddy | 123/491 |
| 4,238,813 | 12/1980 | Carp et al. | 123/490 X |

FOREIGN PATENT DOCUMENTS

| 146241 | 11/1980 | Japan | 123/491 |
| 28537 | 2/1983 | Japan | 123/491 |

Primary Examiner—Tony M. Argenbright
Attorney, Agent, or Firm—Michael J. Striker

[57] ABSTRACT

Method and apparatus for determining an injection moment during a start process of the internal combustion engine, in which the time point of controlling of the injection valve is shifted for a period of time depending upon the number of revolutions of the crank shaft so that the electromagnetically actuated injection valve is controlled when the battery voltage reaches the maximum value.

22 Claims, 15 Drawing Figures

METHOD AND APPARATUS FOR DETERMINING AN INJECTION MOMENT DURING A START PROCESS IN AN INTERNAL COMBUSTION ENGINE

BACKGROUND OF THE INVENTION

The present invention relates to a method and an apparatus for defining a moment of injection during the start process of an internal combustion engine.

The determination of the dosage of fuel during the start of the internal combustion engine has been always problematic to a certain extent, particularly when low or extremely low start temperatures prevail during the starting process. On the one hand, it is required that the cold internal combustion engine be supplied with a certain quantity of fuel in order to compensate for the condensation effect on the cold walls of the cylinders and conduits of the system and to ensure the fastest and sure start of the internal combustion engine, and, on the other hand, the fuel mixture should not be overfattened because in this case the motor may not start at all. Furthermore, a possible increased weakness of the battery which can occur at low start temperatures should be taken into consideration. It is known that the amount of fuel injected during the start process of the internal combustion engine should be carefully adjusted to environment temperatures and to the operation conditions of internal combustion engine, and also to the age and history of the motor; however in the injection installations, in which an intermittent injection has been utilized, difficulties or troubles can occur in the area of an electrically actuated injection valve; then a low voltage of the main power supply, which is supplied back to a loaded battery immediately during the start process, leads to divergence of the start moments in the electromagnetic injection valve from normal or desired.

SUMMARY OF THE INVENTION

It is an object of the present invention to provide an improved method of determining a time point of the fuel injection onset during the starting process of the internal combustion engine.

It is a further object of the invention to provide a method and apparatus, which would provide a reliable actuation as well as the clear start time of the injection valve in the fuel injection device, and which would improve overall start conditions of the motor and would prevent troubles associated with an accurate determination of the fuel dosage during the start process.

These and other objects of the invention are attained by a method for determining a moment of injection of fuel during a start process in an internal combustion engine with an intermittent fuel injection and provided with a main power supply, a battery, a crank shaft and a fuel injection valve, the method comprising the step of controlling a time point for the injection valve, wherein the improvement comprises shifting the time point of the injection valve control for a delay period of time or a delay-angle ($Z_o, t_v$) depending upon the number of revolutions of the crank shaft or upon the voltage of the battery so that said time point respectively occurs approximately within a following maximum value of a cyclically fluctuating voltage of the main power supply depending upon the number of revolutions of the crank shaft or the maximum voltage of the battery.

The objects of the invention are also attained by an apparatus for determining a moment of injection of fuel during a start process in an internal combustion engine with an intermittent fuel injection and provided with a main power supply, a battery, a crank shaft and a fuel injection valve, which apparatus comprises means for shifting a time point for the injection valve for a delay-period of time or a delay-angle depending upon the number of revolutions of the crank shaft or upon the voltage of the battery so that said time point respectively occurs approximately within a following maximum value of a cyclically fluctuating voltage of the main power supply depending upon the number of revolutions of the crank shaft or the maximum voltage of the battery, said means including at least one adder circuit block operative for adding the delay-period of time or the delay-angle, depending upon the number of revolutions of the crank shaft to a time point of the occurrence of an ignition signal defined by reference marks so that an actual time point of injection occurs within the maximum value of the pulsating battery voltage.

The advantage of the process and apparatus according to the invention resides in that, due to the timely shifting or delay of the start of the fuel injection towards the respective voltage maximum of the main power supply even in the case of low start temperatures and of the corresponding extremely low power supply voltage, it is ensured that the maximal value of the voltage of the main power supply always occurs at the time point of the shifted fuel injection start, whereby accuracy of operation of the fuel injection valve will be proportionally increased. For example, with extremely low start temperatures the minimum of the main power supply voltage can occur, which would lead to an almost irregular operation of the fuel injection valve when, for example the power supply voltage of 12 v is taken into consideration, or merely 6 v. However, if the fuel injection valve is controlled under the maximal voltage, which can be in the considered standard situation about 8 v or even higher, the problem of the proper start of the electrically actuated fuel injection valve would be minimized.

The present invention is based on the fact that, during the start of the motor due to the loading of the battery by the starter, particularly at very low starting temperatures, extremely low power supply voltages occur that would have meant rippled condition, which causes the situation where the starter of the battery will always take up a great current when a respective cylinder of the internal combustion engine is in the region of the upper dead. On the other hand, the injection point and also the control of the respective fuel injection valve always occur only when the corresponding cylinder of the motor is at the upper dead point, and also at time point at which the mimimal voltage of the main power supply source occurs.

The invention solves the above described problem usually occurring in conventional internal combustion engines and provides a reliable actuation of a fuel injection valve with the shorter start time under the start conditions of the engine. The present invention renders it possible to introduce an accurate cold start control and makes it possible to indirectly accurately determine the amount of the fuel to be injected during the start process because due to the present invention divergences from the start moment with the high voltage on the electromagnetic fuel injection valves are considerably small.

A further advantage of the present invention resides in optimal possibilities for the fuel injection valve in regard to the linearity of small amounts of the fuel because the critical minimum start voltage does not occur.

Particularly advantageous is the determination of the duration of the shifting for the beginning of the fuel injection from a differential of the battery voltage curve during the start process with the exceeding of the predetermined minimum increase.

The shifting or delay of the injection moment as a function of the number of revolutions of the motor is also advantageous.

A method of the delay of the fuel injection onset in the area of the fuel supply of the internal combustion engine, for improving an exhaust gas composition, has been disclosed in DE-OS No. 29 29 516.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

The basic concept of the proposed invention resides in that the moment of starting of the fuel injection and the control of the injection valve of the internal combustion engine, equipped with an injection unit, are shifted towards a maximum value of the battery voltage, and where an additional time delay, depending on the information about the operation conditions of the internal combustion engine, is introduced in that unit.

Figure 1:
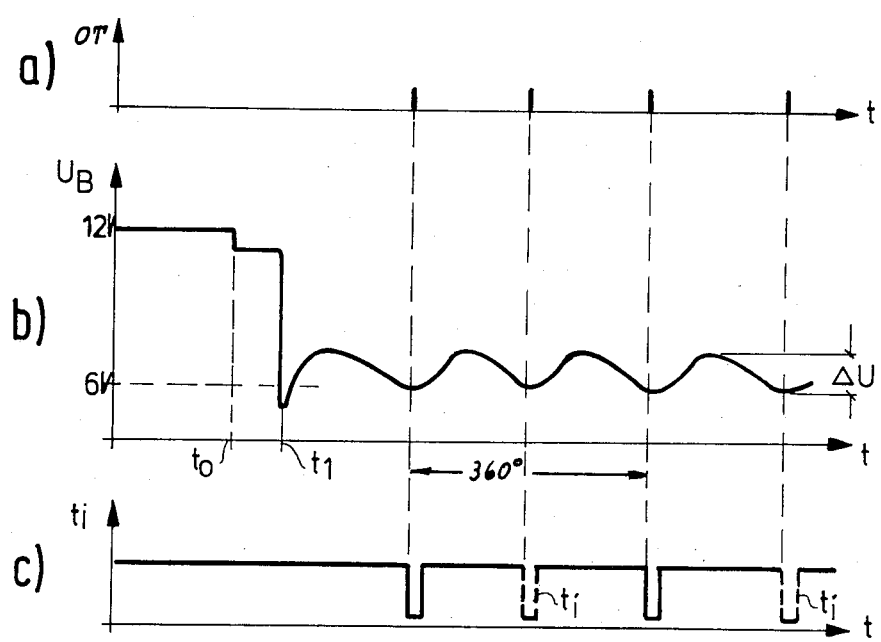
FIGS. 1a–1c shows graphs illustrating curves of the relations of the main power supply voltage or the battery voltage as well as fuel injection impulses to time, according to the prior art.

FIG. 1 shows an injection curve and a battery voltage curve for the internal combustion engine provided with a known injection unit. In the upper graph identified by "a", OT-mark is an upper dead point mark which appears over the time; the graph identified by "b" shows a battery voltage curve $U_B$ which is shifted after the beginning of the start and after the start of the starter. As seen from FIG. 1b, an extremely sharp decline of the battery voltage $U_B$ from assumable 12 v up to 6 v occurs at very low start temperatures with a defined rippled condition $\Delta U$ of the battery voltage $U_B$ which is minimal in the region of the occurrence of the OT-mark. A short time delay between an actual start beginning moment defined by $t_o$ and the point in time the $t_1$ is produced by the shifting of the moment of starting of the starter. The defined waviness of the main supply power voltage results from the fact that the starter draws out a greater current at the upper dead point of the motor and the battery is strongly loaded at the dead point OT, with a corresponding strong voltage breaking.

The principal concept of the relation of injection impulses ti to time t in the known injection unit is shown in FIG. 1c. During the start process towards the OT-time point in this known injection unit injection impulses $t_i$ are produced with additional injection impulses $t_i'$ of a double injection frequency, which is 180° for a normal injection impulse $t_i$; the example shown in FIG. 1 relates to a four-cylinder motor.

Figure 2:
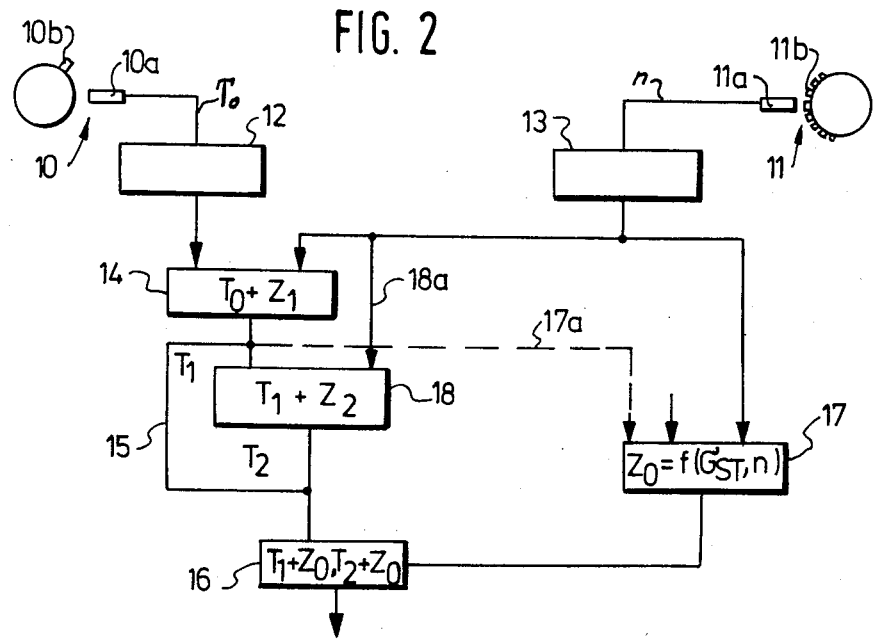
FIG. 2 is a diagrammatic view of the device for shifting a moment of fuel injection with a continuously available information about the positions of the crank shaft.

The flow chart and an operation diagram of FIG. 2 show the first embodiment of the invention. The device for determining a moment of injection onset of the internal combustion engine during the start process includes individual control blocks which carry out determined functions and in cooperation with each other they carry out the basic function of the present invention.

Figure 4:
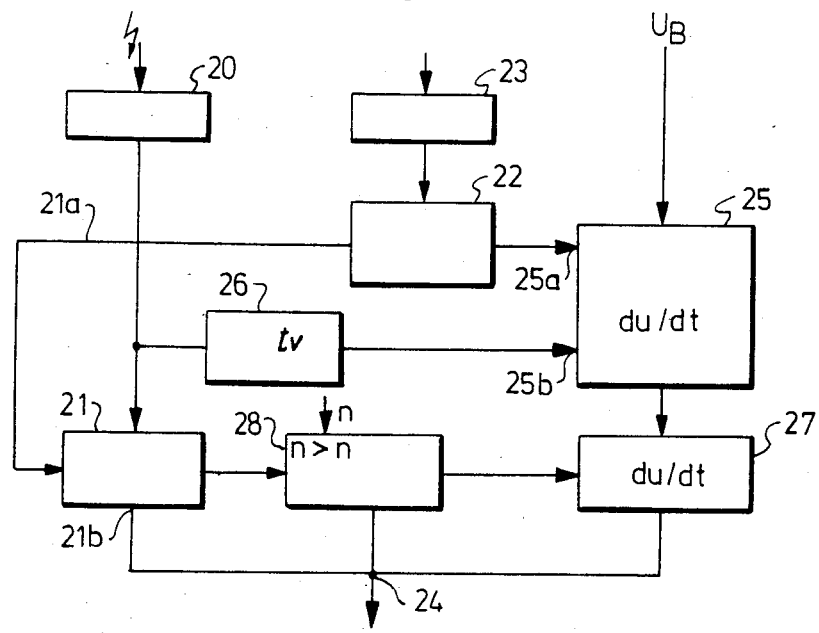
FIG. 4 is a diagrammatic view of the device according to another embodiment of the invention.
Figure 6:
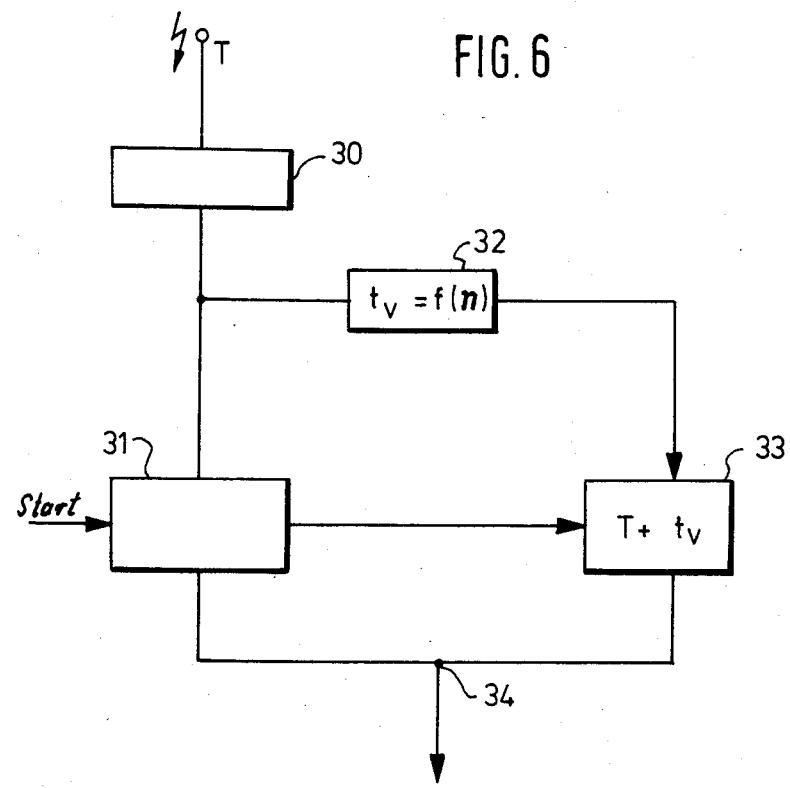
FIG. 6 is a diagrammatic view of yet another embodiment of the invention.

It is to be understood that FIG. 2 as well as FIGS. 4 and 6 illustrate only the certain embodiments of the invention, and this invention can be also realized by means of peripheral transmitters, computers or electronic logic systems cooperating with each other, and particularly by means of microprocessors such as one purpose computers necessary for the starting process or a multiple-purpose computer operated within the limits of the whole concept of the invention and realized in a number of individual areas, such as fuel dosage determination, operation, ignition etc.

The first embodiment of the invention, which is realized with the information aid of the available from the crank shaft operation, includes two transmitter systems, each of which can comprise a commonly known transmitter which carries out two functions. This embodiment is particularly suitable for the realization with digital structural elements and structural groups. The delay of the moment of the ignition is obtained as an angular displacement, for example, by means of counting out of number-of-revolutions marks (displacement relative to a constant $\Delta \alpha$-angle).

Figure 3:
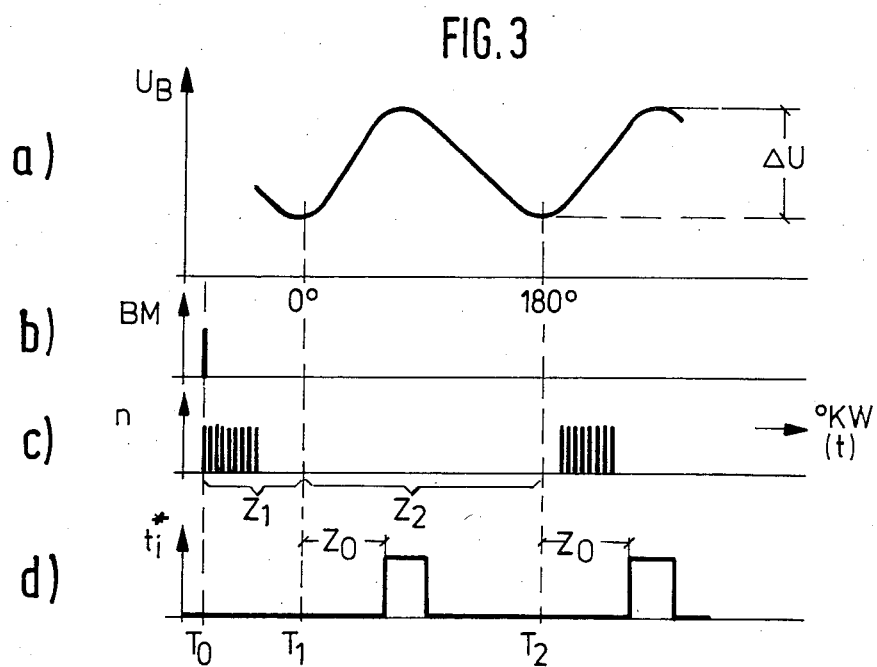
FIGS. 3a–3d show graphs of the curves of the relations of the main power supply voltage or the battery voltage and fuel injection impulses to time according to the device of FIG. 2.

A first transmitter is formed as a reference mark transmitter 10 as seen in FIG. 2. Reference marks BM (in graph 3b), through which a further determination of the time can be found, are introduced in the reference mark transmitter 10 at a given moment To before the crank shaft reaches the position corresponding to the upper dead center OT as shown in FIG. 3. The reference mark transmitter 10 can comprise, for example, an optico-electrical, inductive or capacitive sensor 10a and a transmitter marking element 10b mounted on a structural member synchronously rotated with the crank shaft of the motor. A special marking is also provided in a second transmitter system 11 (shown in FIG. 2), which is formed as a transmitter of a number of revolutions; this second transmitter 11 producing on the gear rim of the starter, rotated synchronously with the crank shaft, number-of-revolutions marks (n-marks obtained upon passing teeth 11b of the rotated gear rim of the starter over a sensor 11a); these n-marks respectively quantize the information about corresponding positions of the crank shaft.

With reference to FIG. 3, it can been seen that the curves identified under (b) and (c) illustrate respectively, the occurrence of reference marks BM in relation to an angle of rotation of the crank shaft (°KW), namely a number of marks per one revolution of the crank shaft, and the occurrence of n-marks in relation to an angle of rotation of the crank shaft (°KW), for example 120 marks per one revolution of the crank shaft. The curve shown in graph (a) in FIG. 3 is the curve of the standing wave ratio of the battery voltage $U_B$.

Signals corresponding to reference marks of the crank shafts, designated by BM, and number-of-revolutions marks, are delivered to preparation blocks 12 and 13, respectively connected to the transmitters or sensors 10a and 11a, and are then supplied to a first evaluation or computer control circuit 14 which adds to those signals an angular displacement $Z_1$ for a normal injection start, which angular displacement depends on the information about the number of revolutions defined by n-marks at the time of occurrence of reference marks BM defined at time point To (and if necessary modified by other parameters). The computer circuit 14 supplies an output time signal $T_1$, via a connection conductor 15 during the further process, immediately to an adder block 16. This adder block 16 finally determines an actual moment of beginning of the fuel injection, which moment for a normal operation is defined as the time point $T_o + z1$, or determines a further angle displacement Zo received from block 17. Individual curves of injection impulses $t_i$ in relation to time are shown in graph "d" of FIG. 3. As can be seen, an additional angle displacement Zo can depend upon at least the information about the number of revolutions of the shaft and, of course upon the start information; this information in general has to to do with the starting process. Due to this additional shifting or displacement a normally calculated injection time point is to displaced or shifted from the region of the upper dead center (minimal voltage of the main power supply) to the region of the maximal voltage of the main power supply, as can be seen from the comparison of the curves in graphs "a" and "d" in FIG. 3. The injection impulses displaced in relation to time, due to the start information, are identified by $t_i^*$. The control block can be formed, for example as an n-mark counter which, after counting out a predetermined number of n-mark impulses (fixed $\Delta\alpha$) in the output signal, produces a corresponding additional angle displacement Zo.

If the system deals with the double injection frequency during the start process, then an angle displacement $Z_2$ corresponding to the crank shaft angle of 180° is added to the time point $T_1$, via a further adder block 18, whereby the angle displacement $Z_2$ can be defined from the n-mark information fed directly to the second adder block 18 via an additional conduit or conductor 18a. Then a second time point $T_2$, shifted by 180° KW, is obtained at the output of the second adder block 18 in a timely raster of the graduation of the crank shaft according to FIG. 3, which second time point is complemented with the additional angle displacement Zo, synchronously supplied from block 17, up to one of additional further injection impulses $t_i^*$ as shown in graph "d" of FIG. 3.

Figure 5:
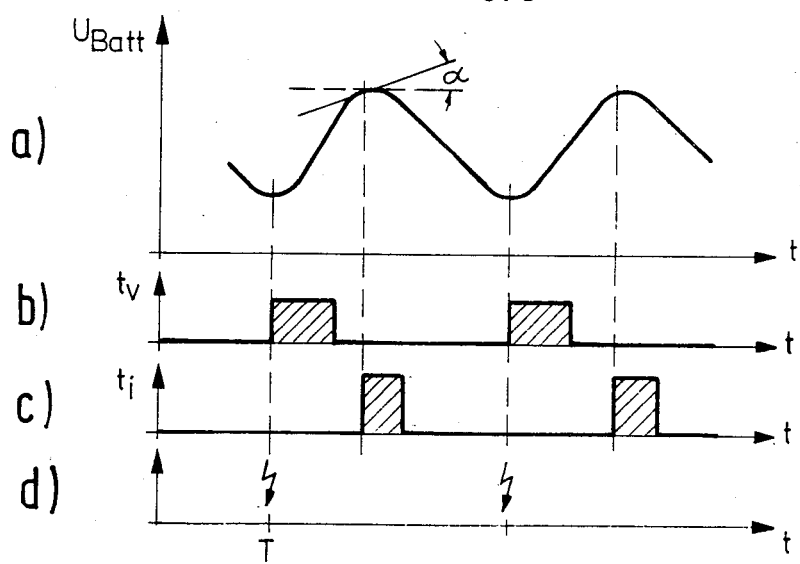
FIGS. 5a–5d show the graphs similar those of FIG. 3 but according to the embodiment of FIG. 4.

In fuel dosing systems, in which the information about the positions of the crank shaft is not available, the time shiftings of the beginning of the fuel injection can be also obtained from the available information about the ignition point in time. FIG. 4 shows a corresponding diagram of the control device whereas FIG. 5 depicts the functional curves of the device of FIG. 4.

The ignition signal, after being processed in a start block 20, is supplied to a first determination or decision circuit 21, which, via a conduit 21a, inquires a start block 22 whether a start condition is generally present; the start information determined, for example from the rotation of the ignition key or from the rotating starter, is supplied to the start block 22 via a further preparation or processing circuit block 23. If no start condition is present, then the ignition signal is supplied from the output 21b of the decision circuit 21 immediately to a switching point 24 which serves for determining an injection time point under normal conditions.

If the start conditions exist, for example in the case of a high start signal in the start block 20, then start block 22 supplies a first release signal to an input 25a of a differential block 25 which forms a differential dU/dt of the battery voltage $U_B$; a further release signal is supplied from a delay time control block or circuit 26 to the differential block 25 at the input 25b thereof. The delay time control block 26, upon the occurrence of the ignition signal, when the injection frequency is 180°, is started up, and after a predetermined delay time period tv, which can be defined in dependence upon the number of revolutions of the crank shaft or can be constant, the formation of the timely derivative of the battery voltage is finally released and the formed differential is supplied to a comparison control block 27 connected to the differential block 26. The formation of the differential dU/dt corresponds to the direct examination of the battery voltage curve.

The comparison of the differential received from the curve of the battery voltage-time relation with the assumed so-called threshold differential does not take place when an additional determination or decision block 28 for the present beginning of the start defines that, for example the number of revolutions of the internal combustion engine lies below the given threshold number of revolutions or, for example when the signal indicating the rippled condition of the battery voltage determines that this given rippled condition (pulsation factor) is exceeded, or an absolute value of the absolute voltage level is exceeded, that would justify the shifting of the time point of the injection. In this case a shifted injection time point-signal is supplied from the comparison circuit 27 to the switching point 24.

The inventive process as a whole can be explained as follows:

After a predetermined time $t_v$ according to an ignition time point (compare the graphs in FIGS. 5b and 5d) the formation of the derivative of the battery voltage is released and determined, whereby at the moment when a corresponding continuously determined derivative of the battery voltage exceeds a predetermined low value (corresponding to angle $\alpha$ in the curve of graph "a" in FIG. 5), which value is designated as $dU/dt_{threshold}$, the time shifting of the control of the injection valve follows. This corresponds to the fuel injection approximately at the upper dead center which in turn corresponds to the maximal value of the battery voltage. The predetermined time-delay value tv from the time delay control circuit 26, with a corresponding delayed triggering of the dU/dt—value for the ignition time point, is therefore recommendable because an increased value also occurs in the minimum of the battery voltage, which increased value is smaller than the threshold value of the temporary differential of the battery voltage. It is understood that the release of the detection or processing of dU/dt can be also accurately handled in the comparison block 27. The time delay is executed until the middle of the predetermined battery voltage is reached ($U_B$ amounts to for example, about 9 V) or when a certain number of revolutions of the motor is reached, that corresponds to the highest battery voltage with the smallest rippled condition (pulsation factor). This is defined from the second comparison block 28, to which the signals, indicating a corresponding number of revolutions of the motor and a battery voltage, are supplied.

Another possibility of the determination of the shifting of the injection moment from the ignition time point is shown in FIG. 6. This possibility is based on the fact that the time between the ignition time point and the occurrence of the maximal voltage in the ripple curve of the battery voltage firmly depends upon the number of revolutions of the motor so that, if start conditions are present, the following shifted-in-time injection start can generally follow after a certain delay in time, which is the function of the number of revolutions; therefore $t_v = f(n)$. According to FIG. 6 the ignition signal, after being processed in block 30, is also supplied to a decision circuit 31, which can structurally and functionally correspond to the decision circuit 21 of FIG. 4, and also to a time-delay circuit block 32 which determines the delay time $t_v = f(n)$ according to the curve of FIG. 7.

The function is such that if the decision circuit 31 indicates that the start condition is present an adder block 33 is controlled, this adder block adding the delay time $t_v$, depending upon the number of revolutions of the motor, to the ignition signal occuring at the time point T and feeding this signal to a switching point 34 for the actual determination of the delayed moment of the ignition start. An impulse image of FIG. 5 is applicable for the circuit structure of FIG. 6, and the simplified modification of the invention shown in FIG. 6 is based on the assumption that the shifting of the injection moment under the start conditions must be executed as long as the control of the injection valve continuously takes place in the region of the maximum of the battery voltage, which has a certain range in regard to time.

Figure 7:
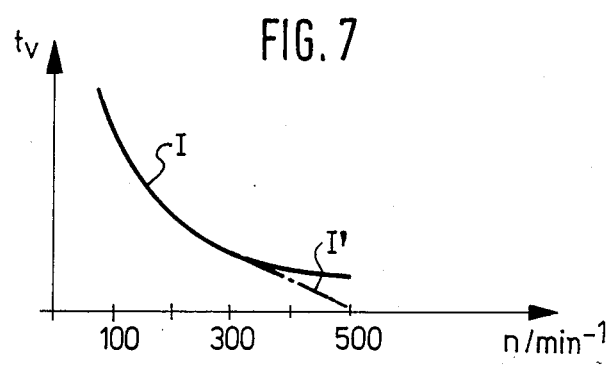
FIG. 7 shows a graph of the relation of the delay time tv to the number of revolutions of the engine, according to the embodiment of FIG. 6.

The course of the curve of FIG. 7 can be realized by means of a respectively formed time transmitter in the region of the delay time circuit block 32, for example by means of the utilization of a monostable multi-vibrator (monoflop) with the controlled life time depending on the number of revolutions. Such time transmitter can be set at the time point T and formed as a monostable sweep circuit. The service time of the monoflop is then referred to the quantity of the incoming information about the number of revolutions of the motor, which approximately correspond to n-mark impulses.

This can be realized by an integrator (condensor) which would sum up the n-marks; the load level of such integrator would be determined as a value for the reverse time of the employed utilized monoflop. The duration of the metastable state of the the monoflop then corresponds to the time of delay depending on the number of revolutions of the motor. The ceasing of the time delay process for the injection start, as seen from FIGS. 6 and 7, can be proceeded gradually in the direction of the course of the curve of FIG. 7 or also proportionally to the determined number of revolutions in accordance with the curve 1' shown by the broken line.

It is understood that the timely delay of the injection impulses can be also obtained only once.

It will be understood that each of the elements described above, or two or more together, may also find a useful application in other types of methods and apparatus for determining an injection moment during the start of internal combustion engines differing from the types described above.

While the invention has been illustrated and described as embodied in a method for determining an injection moment during the start of the internal combustion engone, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for determining a moment of injection of fuel during a start in an internal combustion engine with an intermittent fuel injection and provided with a main power supply, a battery, a crankshaft and a fuel injection valve, the method comprising the step of controlling a time point for the injection valve, wherein the improvement comprising shifting the time point of the injection valve control for a delay-period of time (Zo) depending upon the number of revolutions of the crank shaft so that said time point respectively occurs approximately within a following maximum value of a cyclically fluctuating voltage of the main power supply depending upon the number of revolutions of the crank shaft.

2. The method as defined in claim 1, wherein an information about the crankshaft number of revolutions at an upper dead center, defined by reference marks (BM) and an information about angle positions of the crankshaft, defined by n-marks are available, the method further comprising the step of first determining a normal injection start time point ($T_1$) by adding a first period of time ($Z_1$) defined in dependence upon the n-marks to a time point of the reference marks (To), and then adding a further delay-period of time, depending on the number of revolutions of the crankshaft, to said normal injection start time point ($T_1$) to thereby determine a shifted time of the start of the fuel injection.

3. The method as defined in claim 2, wherein said engine has a predetermined number of cylinders and operates with a double injection frequency, the method including the step of continuously adding to said normal injection start time point ($T_1$) a period of time ($T_2$) corresponding to a given angle of the crank shaft (90°, 120°, 180°) in accordance with the number of cylinders of the engine.

4. The method as defined in claim 1, wherein the information about the angles of the crankshaft is incorrect; and further including the step of determining the shifted time point of the injection valve start from the information about the ignition time point (T).

5. The method as defined in claim 4, further including the steps of determining a time differential (dU/dt) of the voltage of the battery according the predetermined delay-period of time ($t_v$) and comparing said differential with a given threshold differential, releasing a compared value, examining said value in a decision block taking into consideration the start conditions and further defining number of revolution-conditions and battery voltage-conditions, and thereafter controlling said injection valve.

6. The method as defined in claim 4, further including the steps of providing a delay-period of time circuit block and determining the delay-period of time
    in said block at a time point (T) of the occurrence of said ignition signal and wherein an information about the start is available, the method further including the steps of adding said delay-period of time to the time point of the ignition (T) to obtain an added value, and releasing said value for shifting the time point for the injection valve start towards the maximum voltage of the battery.

7. The method as defined in claim 6, wherein the delay-period of time depending upon the number of revolutions follows a predetermined curve and takes up only one-time displacement of injection impulses.

8. An apparatus for determining a moment of injection of fuel during a start in an internal combustion engine with an intermittent fuel injection and provided with a main power supply, a battery, a crankshaft and a fuel injection valve, the apparatus comprising means for shifting a time point for the injection valve for a delay-period of time (Zo) depending upon the number of revolutions of the crankshaft so that said time point respectively occurs approximately within a following maximum value of a cyclically fluctuating voltage of the main power supply depending upon the number of revolutions of the crankshaft, said means including at least one adder circuit block (16, 33) operative for adding the delay-period of time (Z1+Zo) depending upon the number of revolutions of the crankshaft to a time point of the occurrence of an ignition signal defined by reference marks so that an actual time point of injection occurs within the maximum value of the pulsating battery voltage $U_B$.

9. The apparatus as defined in claim 8, wherein an information about the crank shaft number of revolutions, at an upper dead center, defined by reference marks (BM) and an information about angle positions of the crankshaft, defined by n-marks are available, said means further comprising preparation blocks (12, 13) in which the reference marks information at the upper dead center and the information about the angle positions of the crankshaft defined by the n-marks are processed, an additional adder circuit block (14), in which a first predetermined period of time-signal (Z1) depending upon further operation parameters of the engine and defined in dependence upon the n-marks is added to a time point of the reference marks (To) for obtaining a second signal of a time point (T1) referred to a second angle position of the crankshaft, said second time point signal being supplied as an output point to said at least one adder circuit block (16), and a control circuit block (17) which determines said delay-period of time from said n-marks if the start conditions are present, said at least one adder circuit block (16) receiving a delay period of time signal from said control circuit block (17).

10. An apparatus for determining a moment of injection of fuel during a start in an internal combustion engine with an intermittent fuel injection and provided with a main power supply, a battery, a crankshaft and a fuel injection valve, the apparatus comprising means for shifting a time point for the injection valve for a delay-period ($t_v$) depending upon the number of revolutions of the crankshaft so that said time point respectively occurs approximately within a following maximum value of a cyclically fluctuating voltage of the main power supply depending upon the number of revolutions of the crankshaft, said means comprising a differential circuit block (25) for forming a time differential of the battery voltage and releasing a time point of the fuel injection start if start conditions are present.

11. The apparatus as defined in claim 10, wherein an information about the ignition time point is utilized, said means further including a circuit block (30) in which an ignition time signal (T) is processed, a delay-period of time circuit block (32), to which said ignition time signal is supplied from the circuit block (30), said delay-period of time circuit block (32) determining a delay-period of time signal ($t_v$) according to a given curve; an adder circuit block (33) receiving said delay-period of time signal from said circuit block (32) and adding said signal to the ignition time signal, and a decision circuit block (31) connected to said adder circuit block (33), said adder circuit block being controlled by said decision circuit block for releasing the time point of the fuel injection when start conditions are present.

12. The apparatus as defined in claim 10, wherein said differential circuit block (25) is connected immediately to the battery for receiving battery voltage signals from the battery and shifting said time point towards the ignition time point, said differential circuit block releasing the timely differential signal (dU/dt) of the battery voltage ($U_B$); and including a comparison circuit block (27) connected to said differential circuit block and in which said differential signal is compared with a predetermined threshold differential signal and a delay-period of time control signal for starting the injection valve is produced if said differential signal exceeds said threshold differential signal.

13. The apparatus as defined in claim 12, wherein said means further include a start circuit block (22), a first decision circuit (21) connected to said start circuit block and inquiring the latter whether the start conditions are present, a second decision block (28) connected to said first decision block for controlling said first decision block if the start conditions are present, said second decision block (28) being connectable to said comparison circuit block (27) and being disconnected from said comparison circuit block for producing said shifted time point of injection when a predetermined threshold number of revolutions of the crankshaft is not exceeded.

14. A method for determining a moment of injection of fuel during a start in an internal combustion engine with an intermittent fuel injection and provided with a main power supply, a battery, a crankshaft and a fuel injection valve, the method comprising the step of controlling a time point for the injection valve control for a delay-angle ($t_v$) depending upon the voltage of the battery so that said time point respectively occurs approximately within a maximum value of a pulsating battery voltage.

15. The method as defined in claim 14, wherein an information about the crankshaft number of revolutions at an upper dead center, defined by reference marks (BM) and an information about angle positions of the crankshaft, defined by n-marks are available, the method further comprising the steps of first determining a normal injection start time point ($T_1$) by adding a fixed angle of the crankshaft ($Z_1$) defined in dependence upon the n-marks to a time point of the reference marks (To), and then adding a further angle (Zo), depending on the number of revolutions of the crankshaft, to said normal injection start time point (T₁) to thereby determine a shifted time of the start of the fuel injection.

16. The method as defined in claim 15, wherein said engine has a predetermined number of cylinders and operates with a double injection frequency, the method including the step of continuously adding to said normal injection start time point ($T_1$) a period of time ($T_2$) corresponding to a given angle of the crank shaft (90°, 120°, 180°) in accordance with the number of cylinders of the engine.

17. The method as defined in claim 14, further including the steps of determining a time differential (dU/dt) of the voltage of the battery according the predetermined delay-period of time ($t_v$) and comparing said differential with a given threshold differential, releasing a compared value, examining said value in a decision block taking into consideration start conditions and further defining number of revolution-conditions and battery voltage-conditions, and thereafter controlling said injection valve.

18. An apparatus for determining a moment of injection of fuel during a start in an internal combustion engine with an intermittent fuel injection and provided with a main power supply, a battery, a crankshaft and a fuel injection valve, the apparatus comprising means for shifting a time point for the injection valve for delay-angle ($t_v$) depending upon the voltage of the battery, so that said time point respectively occurs approximately within a following maximum value of a pulsating battery voltage, said means including at least one adder circuit block (16, 33) operative for adding the delay-angle ($t_v$) depending upon the number of revolutions of the crankshaft to a time point of the occurrence of an ignition signal defined by reference marks so that an actual time point of injection occurs within the maximum value of the pulsating battery voltage ($u_B$).

19. The apparatus as defined in claim 18, wherein an information about the crankshaft number of revolutions, at an upper dead center, defined by reference marks (BM), and an information about angle positions of the crankshaft, defined by n-marks, are available, said means further comprising preparation blocks (12, 13) in which the reference marks information at the upper dead center and the information about the angle positions of the crankshaft defined by the n-marks are processed, an additional adder circuit block (14), in which a first predetermined period of time-signal ($Z_1$) depending upon further operation parameters of the engine and defined in dependence upon the n-marks is added to a time point of the reference marks (To) for obtaining a second signal of a time point ($T_1$) referred to a second angle position of the crankshaft, said second time point signal being supplied as an output point to said at least one adder circuit block (16), and a control circuit block (17) which determines said delay-angle from said n-marks if start conditions are present, said at least one adder circuit block (16) receiving of delay-angle signal from said control circuit block (17).

20. An apparatus for determining a moment of injection of fuel during a start in an internal combustion engine with an intermittent fuel injection and provided with a main power supply, a battery, a crankshaft and a fuel injection valve, the apparatus comprising means for shifting a time point for the injection valve for a delay-angle (Zo) depending upon the voltage of the battery so that said time point respectively occurs approximately within a maximum value of a pulsating battery voltage, said means comprising a differential circuit block (25) for forming a time differential of the battery voltage and releasing a time point of the fuel injection start if start conditions are present.

21. The apparatus as defined in claim 20, wherein said differential circuit block (25) is connected immediately to the battery for receiving battery voltage signals from the battery and shifting said time point towards the ignition time point, said differential circuit block releasing the time differential signal (dU/dt) of the battery voltage ($U_B$); and including a comparison circuit block (27) connected to said differential circuit block and in which said differential signal is compared with a predetermined threshold differential signal, and a delay-period of time control signal for starting the injection valve is produced if said differential signal exceeds said threshold differential signal.

22. The apparatus as defined in claim 21, wherein said means further include a start circuit block (22), a first decision circuit (21) connected to said start circuit block and inquiring the latter whether start conditions are present, a second decision block (28) connected to said first decision block for controlling said first decision block if start conditions are present, said second decision block (28) being connectable to said comparison circuit block (27) and being disconnected from said comparison circuit block for producing said shifted time point of injection until a determined battery voltage lies in the middle.

* * * * *